Aug. 18, 1931. H. B. PALMER 1,819,259
AUTOMOBILE STEERING COLUMN AND IGNITION LOCK
Filed June 10, 1929 3 Sheets-Sheet 1
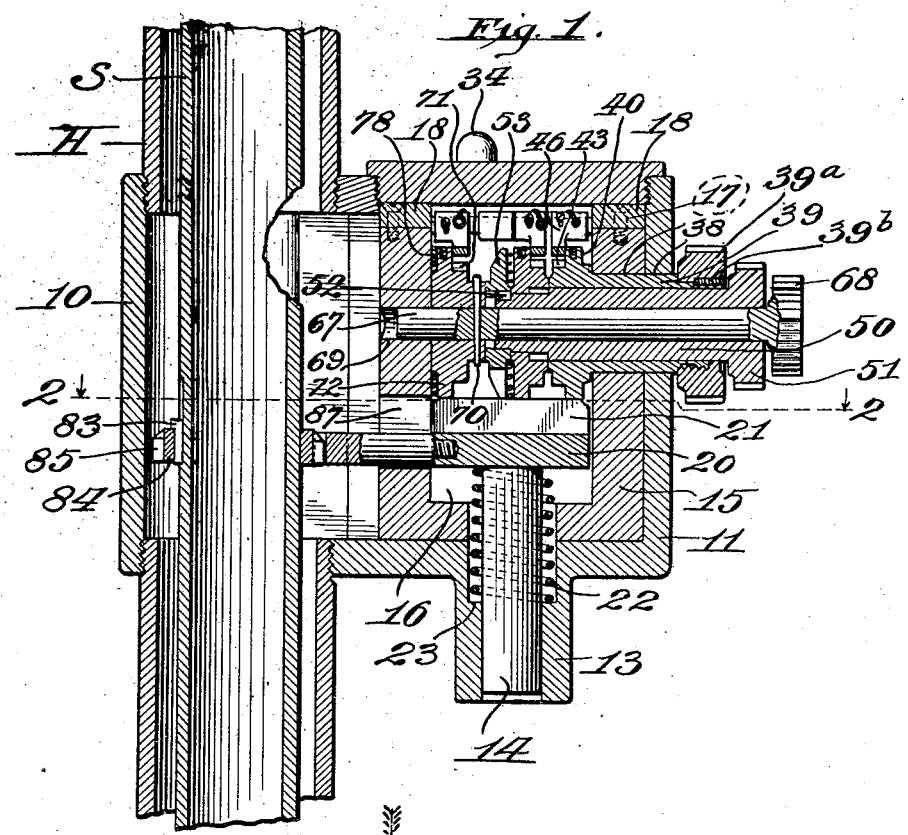
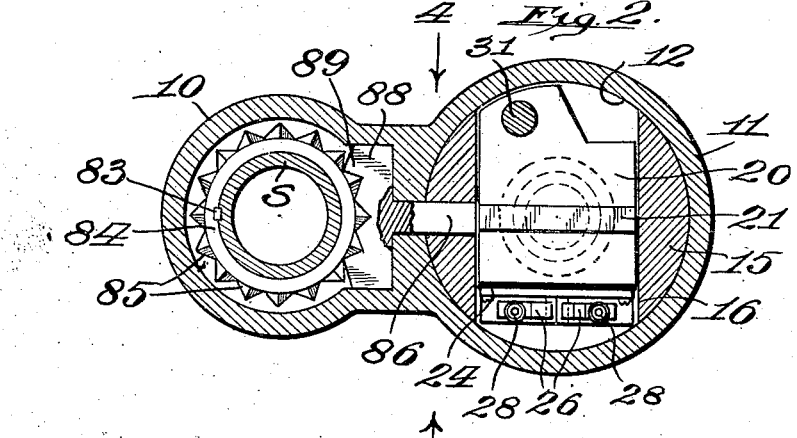
Inventor
Harold B. Palmer
By Martin P. Smith
Attorney

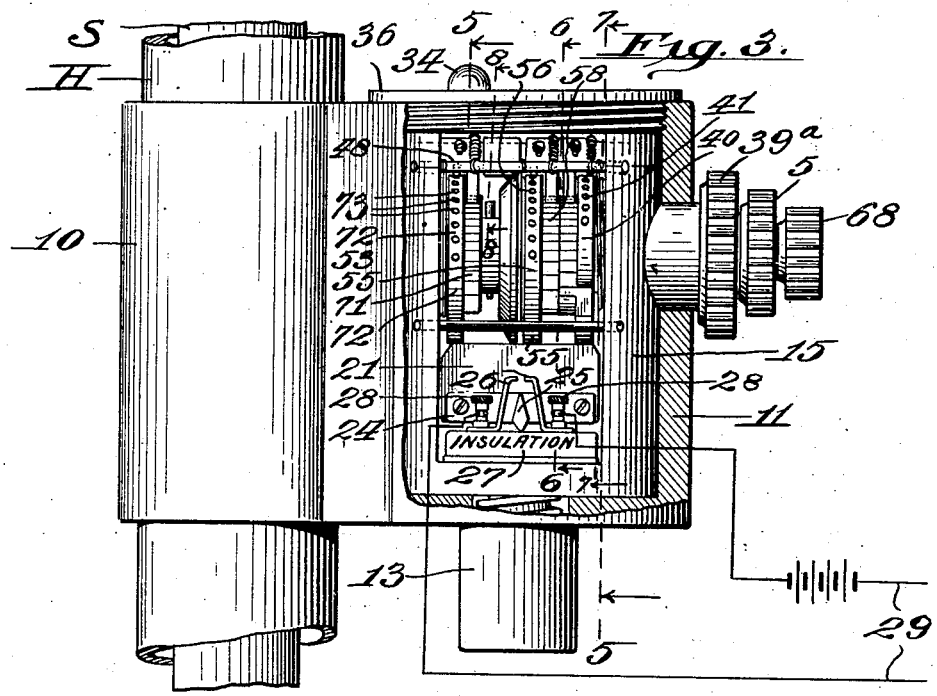

Aug. 18, 1931.  H. B. PALMER  1,819,259
AUTOMOBILE STEERING COLUMN AND IGNITION LOCK
Filed June 10, 1929  3 Sheets-Sheet 3
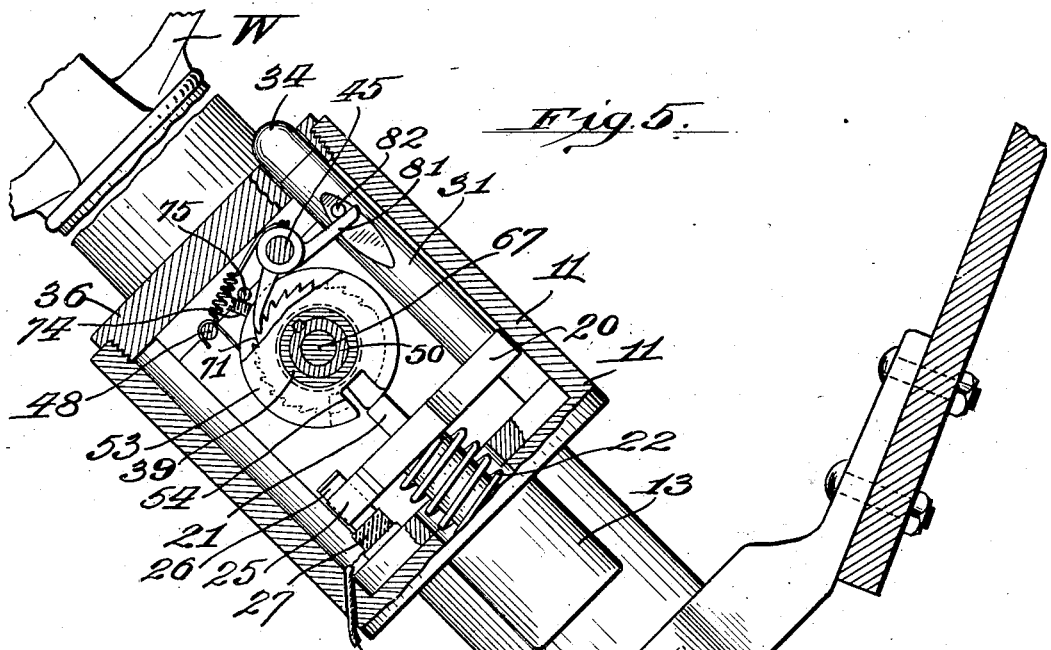
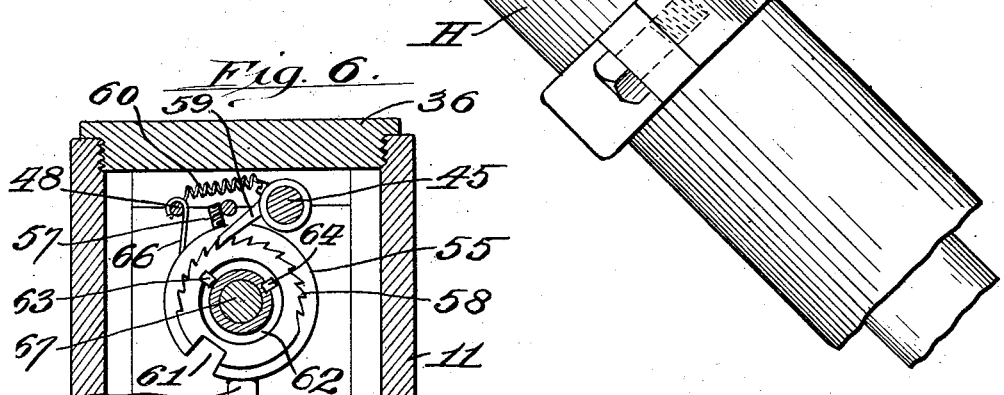
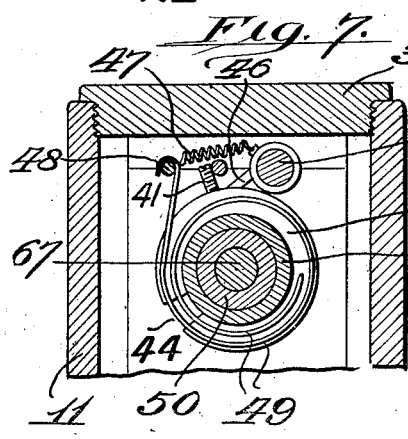
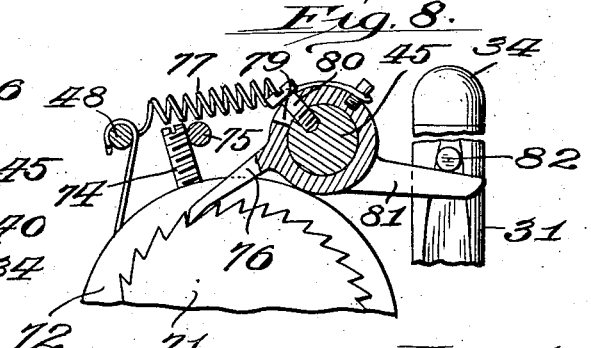
Inventor
Harold B. Palmer
By Martin P. Smith
Attorney Patented Aug. 18, 1931

1,819,259

UNITED STATES PATENT OFFICE

HAROLD B. PALMER, OF SAN DIEGO, CALIFORNIA

AUTOMOBILE STEERING COLUMN AND IGNITION LOCK

Application filed June 10, 1929. Serial No. 369,623.

My invention relates generally to a combination locking mechanism and more particularly to a lock that is especially designed for use on automobiles for positively locking the steering column and at the same time opening the circuit of the ignition system of the vehicle in order to effectually prevent the theft or unauthorized use of the vehicle with which the locking mechanism is associated.
My present invention is an improvement upon the lock forming the subject matter of my copending application for United States Letters Patent filed May 1, 1928, Sr. No. 274,241, and the principal object of my present invention is to generally improve upon and simplify the construction of the lock disclosed in my aforesaid copending patent application and to locate the lock where it may be conveniently reached for manipulation by the driver of the equipped vehicle.

Further objects of my invention are to generally improve upon and simplify the construction of the existing forms of motor vehicle locks, to construct and arrange the parts of the lock so as to make it practically impossible for unauthorized persons to remove any portion of the lock or to solve the combination thereof, further to provide a lock of the character referred to wherein a locking bolt or member is moved into engagement with a cooperating member that is rigidly fixed upon the steering column of the vehicle so as to lock said column against rotary movement in both directions, and further to construct the lock so that all parts thereof, with the exception of the disks or knobs that are utilized in setting the combination to release the lock, are located wholly within a housing that is formed of hard tough metal that will effectually resist the action of files, hack-saws, cold chisels and the like that might be used in an attempt to break the lock.

A further object of my invention is to provide a relatively simple and practical form of lock that is adapted to be combined with the tubular housing of the steering column and said lock being located on said housing a short distance below the steering wheel
that is carried by the upper end of the steer-
ing column, thus enabling the lock to be easily and conveniently manipulated by the vehicle driver.

With the foregoing and other objects in view, my invention consists in certain novel features of construction and arrangement of parts that will hereinafter be more fully described and claimed and illustrated in the accompanying drawings, in which:

Fig. 1 is a vertical section taken through the center of my improved lock and showing the same applied to the steering column and its housing with the latter parts in vertical section.

Fig. 2 is a horizontal section taken on the line 2—2 of Fig. 1.

Fig. 3 is an elevational view of the lock looking in the direction indicated by the arrow 3 in Fig. 2, and showing the lock housing broken away in order to more clearly illustrate the internal operating parts of the lock.

Fig. 4 is an elevational view looking in the direction indicated by the arrow 4 in Fig. 2, and with the lock housing broken away to show the internally arranged parts of the lock.

Fig. 5 is a vertical section taken approximately on the line 5—5 of Fig. 3.

Fig. 6 is a vertical section taken approximately on the line 6—6 of Fig. 3.

Fig. 7 is a vertical section taken approximately on the line 7—7 of Fig. 3.

Fig. 8 is an enlarged detail section taken on the line 8—8 of Fig. 3.

Referring by numerals to the accompanying drawings which illustrate a practical embodiment of my invention, 10 designates a tubular member formed of manganese steel or iron or other hard tough metal, and screwed into the ends of this tubular member are sections of the housing H that encloses the steering column S of a motor vehicle, and which column carries at its upper end the usual steering wheel W.

The member 10 is preferably interposed in the housing H just below the steering wheel in order that the lock that is carried by the tubular member may be conveniently reached and manipulated by the vehicle driver.

Formed integral with the side of the tubular member 10 and projecting laterally therefrom is a hollow cylindrical shell or housing 11 of hardened metal and the cylindrical chamber 12 within said housing is occupied by the greater portion of my improved locking mechanism.

Formed integral with the bottom of the housing 11 is a short depending tubular lug 13 which serves as a bearing and guide for a bolt or plunger 14 that forms a part of the locking mechanism.

Fitting snugly within the chamber 12 is a short cylindrical block 15 that serves as a supporting arm or carrier for the principal parts of the lock, and formed in said block is a centrally arranged opening 16 that extends to the top of the block and which terminates a short distance above the bottom of the block.

Removably positioned on top of the block 15 to the sides of the opening 16 and retained in position by screws 17 are plates 18 that function as the upper portions of bearings for a plurality of transversely disposed rods that extend across the upper portion of the opening 16 and the ends of said rods being journaled in bearings between the top of the block and the plates 18.

Formed integral with or fixed to the upper end of the bolt 14 is a plate 20 and arranged on top thereof is an integral transversely disposed rub or flange 21 arranged beneath the plate 20 and surrounding the bolt 14 is an expansive coil spring 22, the lower end of which rests on a shoulder 23 that is formed within the tubular projection 13 around the opening therethrough. This spring is under compression so that it normally tends to lift the plate 20 and the parts carried thereby.

Mounted on one end of plate 20 and insulated therefrom is a horizontally disposed bar 24 and projecting outwardly from the center thereof is a wedge-shaped finger 25 which, when plate 20 is elevated or in its uppermost position, makes contact with the inturned ends of a pair of contact springs 26 that are secured to a block 27 of insulation, and the latter being secured in any suitable manner on the bottom of the opening 16 in block 15.

Carried by the lower ends of the contact springs 26 are binding posts 28 and connected thereto are conductors 29 that form a part of the ignition system of the vehicle with which the lock is associated.

As a result of the construction just described the ignition circuit is open while the plate 20 is in its lowermost position and when said plate is elevated the wedge-shaped finger 25 passes between and engages the inturned ends of the contact springs 26, thereby closing the ignition circuit of the vehicle.

Formed integral with and projecting upwardly from the plate 20 on the opposite end from the end that carries the bar 24 and contact finger 25 is a post 31 that extends upwardly through the opening 16, and screw seated in the upper end of this post is the threaded lower portion of a short stem 32, which latter is provided intermediate its ends with a circumferential groove 33.

Mounted to rotate freely on the projecting upper portion of the stem 32 is a cap or stud 34 of hardened metal having a rounded upper surface, and said stud is retained upon the stem by a pin or screw 35 that is seated in said stud and which enters the groove 33.

The upper end of the chamber 12 that is occupied by the greater portion of the locking mechanism is closed by a disk-shaped plate 36, the lower portion of which is threaded in order that it may be screwed into the internally threaded upper portion of chamber 12 and when properly seated in the upper portion of the housing 11 the under face of this plate bears directly on top of the cap plates 18.

Formed through plate 36 is an aperture 37 for the accommodation of the upper end of post 31 and the stud 34 and when post 31 is moved downward by pressure applied to the stud the retaining screw 35 is positioned wholly below the upper surface of the plate 36 where it is inaccessible to persons attempting to open the lock.

When plate 20 and bolt 14 are moved downward into locking position only the rounded upper end of stud 34 projects above the top of plate 36, and owing to the shape of said stud and the fact that it is mounted to rotate freely on the upper end of the post 31, it is practically impossible for tools, such as pliers or a wrench, to be clamped or engaged on the projecting portion of the stud in an attempt to open the lock.

The length of the stud 34 and the vertical movement of post 31 are such that when the rod is elevated the stud is positioned above the top surface of plate 36, thereby giving access to the pin or screw 35 and at such time the locking member that is carried by plate 20 and which engages the steering column is in open or unlocked position.

When rod 31 is moved downward to its limit of movement, the joint between the upper end of said rod and the stud 34 occupies a plane a substantial distance below the top surface of plate 36, as illustrated in Fig. 4.

The construction just described is essential to the assembly of the parts of the lock and to the removal thereof in the event it should become necessary for the vehicle owner to remove the operating parts of the lock from the housing.

Formed in the outer side wall of the housing 11, and in one side of the block or frame 15, are coinciding apertures 38 that are occupied by a sleeve 39, and detachably mounted on the outer end of said sleeve, is a disc or knob 39a having a milled edge, and which is locked to the end of said sleeve by means of a pin or screw 39b that is inserted in the joint between said disc and sleeve.

Formed integral with or fixed to the inner end of sleeve 39, is a disc 40, and formed in the periphery thereof, is a series of threaded apertures 41, and adapted to be removably seated in any one of said apertures, is a radially disposed threaded pin 42.

Formed integral with the inner face of the disc 40 and with the inner end of sleeve 39, is a ratchet wheel 43, and formed in the edge of this ratchet wheel and the disc 40, is a notch 44 that is adapted to receive the bar 21 that is arranged on the top of plate 20.

The ends of a transversely disposed rod 45 are seated in bearings in the upper end of frame 15, and retained in said bearings by the cap plates 18, and mounted on this rod is a pawl 46, the point of which engages the teeth of ratchet wheel 43. A small retractile spring 47 is connected at one end to pawl 46 and at the other end to a small transversely disposed rod 48 that is positioned between the upper end of frame 15 and the caps 18 at a point in front of rod 45, and this spring normally retains the point of the pawl 46 in engagement with a tooth of ratchet wheel 43. Secured to one of the side faces of disc 40 is one end of a spiral spring 49, the same being wound once or twice around the sleeve 39, and the opposite end of said spring is provided with a hook that engages over the rod 48.

Extending through sleeve 39 is an inner sleeve 50, and formed integral with, or fixed to the outer end thereof, is a disc or knob 51 having a knurled edge, and said disc or knob being slightly smaller in diameter than the disc or knob 39a.

The inner end of this inner sleeve projects a short distance beyond the inner end of sleeve 39, and secured to said projecting inner end, preferably by means of a key 52, is a disc 53 that is provided in its edge with a notch 54, and which latter is adapted to receive transverse bar 21. Loosely mounted on the projecting inner end of sleeve 50, between the disc 53 and the ratchet wheel 43, is a disc 55 in the periphery of which is formed a series of threaded apertures 56, and adapted to be screw seated in any one of said apertures, is a threaded pin 57. Formed integral with the disc 53 and positioned immediately adjacent to ratchet wheel 43, is a ratchet wheel 58, and adapted to engage the teeth thereof is the point of a pawl 59 that is mounted on rod 45. A small retractile spring 60 has one end connected to the hub of pawl 59 and the opposite end of said spring is connected to rod 48. Formed in the edges of the disc 55 and ratchet wheel 58, is a notch 61 that is adapted to receive transverse bar 21.

Formed in the face of ratchet wheel 58, adjacent to the face of ratchet wheel 43 is a recess 62, and seated in the ratchet wheel 58 and projecting into this recess, is a key or lug 63. Seated in that portion of the projecting inner end of sleeve 50 that occupies the recess 62 and projecting into said recess, is a key or lug 64 that is adapted, when the sleeve 50 is rotated, to engage the key or lug 63 and thus carry the ratchet wheel 58 and disc 55 with said sleeve when the latter is rotated.

The inner end of a spiral spring 66 is directly connected to disc 55, and the outer end of said spring is hooked over rod 48.

A shaft 67 extends through and is connected for rotation in the inner sleeve 50 and the outer end of said shaft carries a disc or knob 68 having a milled edge, and which disc or knob is slightly smaller in diameter than knob 51. The inner end of shaft 67 is journaled in a bearing 69 in the corresponding portion of the block or frame 15. Removably mounted on the inner portion of shaft 67, and retained thereon by means of a pin 70, that passes diametrically through said shaft, is the hub portion of a ratchet wheel 71, and formed integral with said ratchet wheel, is a disc 72 in the periphery of which is formed a series of threaded apertures 73, any one of which is adapted to receive a threaded pin 74.

The ends of a transversely disposed rod 75 are mounted in the upper portion of the frame 15, below the cap plates 18 between the rods 48 and 45, and which rod 75 serves as a stop, against which the pins 42, 57 and 74 engage to limit the rotary movement in one direction of the discs in which said pins are seated, and the shaft and sleeves that carry said discs. Adapted to engage the teeth of ratchet wheel 71, is the point of a pawl 76, and connected to the hub portion thereof is the end of a retractile spring 77, the opposite end being formed into a hook that engages rod 48.

One end of a spiral spring 78 is seated in the face of disc 72 and the outer end of said spring is provided with a hook that engages rod 48.

The pawls 46, 59 and 76 are mounted so as to have a limited degree of rotary movement relative to the supporting shaft 45, and this provision is brought about by forming in the hub portions of each pawl, a relatively short slot such as 79 (see Fig. 8) and passing through each slot is a pin or screw 80 that is seated in the shaft 45. Thus, the shaft 45 and the pawls carried thereby are connected so that they have a limited degree of relative rotary movement. The retractile springs associated with the three pawls normally hold the points thereof in engagement with the respective ratchet wheels, and with the pawls so positioned the screws or pins 80 are at the rear ends of the slots 70, as illustrated in Fig. 8.

Fixed on shaft 45 in any suitable manner, is the hub portion of a short rearwardly projecting finger 81, and the outer portion of which finger is positioned beneath a pin 82 that projects laterally from the upper portion of rod 31 (see Fig. 5).

Rigidly fixed in any suitable manner, preferably by means of a key 83 to the steering column S and within the lower portion of the housing 10, is a ring 84 provided on its outer periphery with V-shaped teeth 85, the tops of which decline in both directions from their apices to the notches between said teeth.

Rigidly fixed in any suitable manner to the inner side of plate 20 is a horizontally disposed pin 86 that projects through a vertically disposed slot 87 that is formed in the partition between housings 10 and 11, and carried by the outer end of this pin is a horizontally disposed plate 88 that occupies the chamber within housing 10 and the outer edge of said plate 88 is provided with V-shaped teeth 89 that are adapted to engage between the teeth 85 on ring 84.

When my improved lock is in position to lock the steering column S the plate 20 is retained in its lowermost position with the upper edge of the bar 21 bearing against the edges of the disks 40, 55 and 72, as illustrated in Fig. 1, and when so positioned plate 88 carried by plate 20 is in horizontal alinement with the toothed ring 84 and the engagement of the teeth 89 with the teeth 85 on said ring effectually locks the steering column against rotary movement in both directions and consequently it will be impossible to rotate the steering column to steer the car, even though the car were towed or pushed forwardly.

With the parts of the lock thus positioned the plunger rod 31 that extends upwardly from plate 20 is moved downwardly into the housing 11 so that only the rounded upper end of the stud 34 projects above plate 36.

With the locking bolt thus positioned, the switch finger 25 is positioned below and out of contact with the inturned upper ends of the contact springs 26, and thus the ignition circuit is open. When the bolt 14 is moved downward into locking position, spring 22 is compressed to a certain degree, thereby producing tension in said spring, and the locking bolt and parts associated therewith are effectually held against upward movement by the engagement of the upper edge of the block or bar 21 against the peripheries of the discs 40, 44 and 72, it being understood that the notches in said discs are at this time out of alignment with each other and out of registration with the bar or block 21. The relative positions of the discs and their notches are controlled by the positions of the screws or pins 42, 57 and 74 in the peripheries of the discs.

While the bolt is in locking position, these pins or screws all bear against the cross-rod 75 and, consequently, hold the discs so that the notches therein are out of alignment with each other and out of registration with the bar 21, consequently said bar and the parts associated therewith cannot move vertically so as to withdraw the teeth 89 on plate 88 from engagement with teeth 85 on ring 84.

We will assume that the lock is set to be opened by the combination "2—4—6", the "2" representing the number of notches that ratchet wheel 71, carried by shaft 67, must be rotated to bring the notch in disc 72 into position directly above bar 21, the numeral "4" representing the number of teeth on ratchet wheel 58 that must be moved to position disc 55 so that the notch 61 therein is positioned directly above bar 21 and in transverse alignment with the notch in disc 72, and the numeral "6" representing the number of teeth that ratchet wheel 43 carried by the outer sleeve 39, must be moved to bring the notch 44 in disc 40 into position immediately above cross-bar 21, and in alignment with the notches in the discs 55 and 72.

Obviously, any other combination of three numerals may be utilized such combinations being controlled or established by arranging the pins 42, 57 and 74 in different apertures in the edges of the respective discs 40, 55 and 72, and by providing twelve or fifteen of the apertures in each disc, a large number of combinations may be produced.

Under such conditions, the car owner or person knowing the combination engages knob 68 and turns same to rotate shaft 67, and when ratchet wheel 71 that is carried by said shaft travels a distance of six teeth, past the point of pawl 76, and which travel is indicated by the clicking of the pawl past the teeth, the operator is aware that the ratchet wheel and disc 72 have been moved into position so that the notch in said ratchet wheel is positioned directly above bar 21.

The operator now engages knob 51 to which disc 53 is fixed, and upon which disc 55 and its ratchet wheel are loosely mounted and rotate said knob and the sleeve 50 until the key or lug 64, that is carried by said sleeve, engages the key or lug 63 that is carried by disc 55, and after said lugs have been engaged, the knob 51 is rotated until four teeth on the ratchet wheel 58 have passed the point of pawl 69, which travel is indicated by the clicks produced by the point of the pawl passing the four teeth, and such movement brings the notch 61 in disc 55 into position directly above bar 21, and in alignment with the notch in the disc 72. When this portion of the combination has been completed, disc 53 is positioned so that its notch 54 is out of alignment with the notches in the discs 55 and 72.

The operator now engages knob 39a and manipulates same so as to rotate the outer sleeve 39 a distance of six notches on ratchet wheel 43, which distance is indicated by the clicks produced by the pawl 46 as the same passes the teeth of said ratch wheel, and this operation positions the notch 44 in disc 40 immediately above the cross-bar 21 and in transverse alignment with the notches in discs 55 and 72. The operator now reengages knob 51 and reversely rotates sleeve 50 and when the notch 54 in disc 53 that is carried by the inner end of said sleeve reaches a position directly above bar 21 and in transverse alignment with the notches in the discs 40, 55 and 72 the tension of spring 22 will move bolt 14 and parts carried thereby upward, thus moving the bar 20 into the aligned notches and elevating plate 88 so as to withdraw the teeth 89 from the teeth 85 on ring 84 that is fixed on the steering column S, thereby enabling the latter to be rotated in either direction to steer the vehicle during operation thereof. As the bolt is thus moved upward or into unlocked position, the wedge-shaped contact finger 25 moves into position between the inturned upper ends of the springs 26, thereby closing the ignition circuit; consequently enabling the motor of the vehicle to be started and operated.

It will be understood that when the combination is manipulated, as just described to unlock the parts of the locking mechanism, the spiral springs associated with the three discs are partially wound, thereby storing tension therein, and which tension is utilized for restoring the discs and the parts connected thereto, to their normal positions when the pawls that engage the ratchet wheels on said discs are released. It will also be understood that the combination may be manipulated in any sequence, i. e., any one of the three knobs may be manipulated, first, second or third, for the operation of each knob and the parts associated therewith is entirely independent of the operation of the other knobs and their parts, it only being necessary to operate each knob the proper distance or proper number of teeth of the corresponding ratchet wheel to bring the notches in the four discs into transverse alignment so as to receive bar 21 when the same is moved upward under the influence of spring 22.

Disc 53 which is fixed on the inner end of sleeve 50 functions as a "dummy" disc or tumbler, for it must be rotated so as to bring its notch into alignment with the notches in the other discs after disc 55 has been moved into position to bring its notch into alignment with the notches in the discs 40 and 72, and which disc 55 is actuated from the sleeve 50 through the engagement with the key or lug 64 of lug 63.

When the car owner or authorized driver desires to lock the car the cap 34 on the upper end of rod 31 is engaged and forced downwardly against the resistance offered by spring 22, and as said rod is thus moved downward the pin 82 that projects from the side of said rod bears on the finger 81 that is fixed to and projects rearwardly from shaft 45, thereby slightly rotating said shaft, and the pins or screws 80 that pass through the slot 79 in the hubs of the pawls 46, 59 and 76 will simultaneously actuate said pawls so as to disengage the points thereof from the teeth of the respective ratchet wheels, and the latter will, under the influence of the spiral springs that are associated with the discs, immediately reversely rotate said discs and the ratchet wheels carried thereby until the pins or screws 42, 57 and 74 reengage against the transverse rod 75, and thus the notches in the respective discs are positioned so that they are out of alignment with each other and out of registration with the bar 21.

When downward pressure on the rod 31 is relieved, spring 22 will move bolt 14 upward until the upper edge of bar 21 engages against the peripheries of disks 40, 55 and 72 and thus the notched plate 88 will be prevented from moving upward until the combination of the lock is subsequently manipulated to align the notches in the disks and permit the bar 21 and parts associated therewith to move upward, as hereinbefore described.

As hereinbefore stated, I prefer to make the housings 10 and 11 of manganese steel, and in order to effectually resist attempts to break the lock through the use of tools, such as cold chisels, hacksaws, pliers and the like, I prefer to make the discs 36, the cap 34 for the rods 31, and the knobs, of metal capable of being case hardened.

The various parts of the lock are assembled within the block or housing 11, thereby making it practically impossible to remove the lock while the same is in locking position. Even tho the knobs and projecting portions of the sleeves 39 and 50 and the shaft 67 are broken or cut off, the internal parts of the locking mechanism are still inaccessible.

There is practically little, if any, wear on the operating parts of the lock, and therefore, the necessity for lubrication is eliminated.

An especially desirable feature of my improved lock is the location thereof on the housing of the steering column directly below the steering wheel where it is convenient to the hand of the car driver. Although the locking mechanism is especially desirable for locking the steering column of motor vehicles, the lock, with minor structural changes, may be advantageously employed for locking any device or structure that requires a relatively simple, convenient and efficient theft-proof lock.

It will be understood that minor changes in the size, form and construction of the various parts of my improved combination locking mechanism may be made and substituted for those herein shown and described without departing from the spirit of my invention, the scope of which is set forth in the appended claims.

I claim as my invention:

1. The combination with a rotatably mounted member, of a toothed ring fixed on said member, a spring pressed plunger having a toothed portion that is adapted to engage the teeth of the ring to lock the rotatably mounted member against rotation, a series of independently movable rotary disks provided in their edges with notches which when aligned with each other are adapted to receive a portion of the plunger and manually engageable means for independently rotating said disks to bring the notches therein into alinement with each other.

2. The combination with a rotatably mounted member, of a notched ring secured to said rotatably mounted member, a spring pressed plunger, a plurality of coaxial disks provided in their edges with notches adapted to receive a part of said plunger when said notches are in alinement with each other, a notched member carried by said plunger and adapted to engage the notches in the ring, a shaft carrying one of said disks, independently operable coaxial sleeves carrying the other disks, and a notched disk carried by one of said sleeves and cooperating with the disk carried thereby for retaining the plunger in locked position.

3. In a combination lock, a housing, a rotatably mounted member extending through said housing, a notched ring carried by said rotatably mounted member and arranged within said housing, a plunger arranged for operation within said housing and having a notched portion that is adapted to engage with the notched ring to lock the rotatably mounted member against rotation in both directions, a series of independently operable disks arranged for operation within the housing and provided with notches which when aligned are adapted to receive a portion of the plunger when the notched portion thereof is out of engagement with the notched ring, and manually engageable means for independently rotating said disks to bring the notches therein into alinement with each other.

4. The combination with the tubular housing of a motor vehicle steering column, of a lock housing interposed in said tubular housing, a notched ring secured to the steering column within said lock housing, a spring pressed plate arranged for operation within said lock housing, a notched member carried by said plate and adapted to engage the notched ring to lock the steering column against rotary movement in both directions, a series of coaxial independently operable disks arranged within the lock housing and provided in their edges with notches, and a bar carried by the top of said plate and adapted to engage in the notches of the disk when the same are in alignment with each other.

5. The combination with a rotatably mounted member, of a toothed ring fixed on said member, a vertically movable spring pressed plunger having a toothed portion that is adapted to engage the teeth of the ring to lock the rotatably mounted member against rotation, a series of manually operable independently movable rotary discs provided in their edges with notches which when aligned with each other are adapted to receive a portion of the plunger, spring held ratchet wheels cooperating with said discs, independently operable detents for engaging the teeth of said ratchet wheels and means for simultaneously actuating said detents to release the ratchet wheels.

In testimony whereof I affix my signature.

HAROLD B. PALMER.